March 16, 1954     R. G. WARREN ET AL     2,672,054

MOUNTING MEANS FOR GYROSCOPES

Filed Sept. 3, 1952

INVENTORS
RONALD G. WARREN
STEPHEN KOWALYSHYN
LEO S. RADKOWSKI
H. E. ELLERMAN JR.

BY

ATTORNEYS

Patented Mar. 16, 1954

2,672,054

UNITED STATES PATENT OFFICE 2,672,054

MOUNTING MEANS FOR GYROSCOPES

Ronald G. Warren, Stephen Kowalyshyn, Leo S. Radkowski, and Harry E. Ellerman, Jr., Sharon, Pa., assignors, by mesne assignments, to the United States of America as represented by the Secretary of the Navy Application September 3, 1952, Serial No. 307,626

3 Claims. (Cl. 74—5.5)

The present invention relates to an improved mounting means for gyroscopic instruments and more particularly to an improved mounting means utilizing torsion springs to axially support the gyroscope gimbal and provided with magnetic damping means for said gimbal.

Two of the difficulties on previous pitch rate gyroscopes were the problems of setting the electrical pickoff of the gimbal to give minimum voltage at zero pitch rate, and for the gyroscope gimbal to return to this minimum voltage output position after any given pitch rate has precessed the gyroscope gimbal.

On previous gyroscopes, the stator of the electrical pickoff unit was rotated to bring the voltage output to its zero. By using the two torsion springs of the present invention the end of one of them can be twisted which will move the entire gyroscope gimbal and rotor of the pickoff, so as to obtain electrical zero. A definite point for electrical zero position of the gimbal is obtained by the use of two springs in torsion.

The cantilever spring used in prior art gyroscopes was fastened at two points, one of which was not on the axis of the gimbal. The torque produced by this spring was not a linear function of angular displacement. The result was that certain sections of the spring were worked near maximum allowable stress, which thereby caused the spring to take permanent sets. Since each spring in the present invention is in pure torsion, the spring curves are linear, and the tendency for the springs to take permanent set is eliminated.

The arrangement of springs disclosed by the present invention automatically eliminates the need for thrust bearings, since the gimbal is held in position along its axis by a slight tension in the springs. This reduces the friction in the bearing assembly, permitting the gimbal to more easily return to its zero position.

Prior art gyroscopes were equipped with air dash pots for damping. Dust collects in the air dashpot, causing undue friction thereby preventing the gyroscope from returning to zero position. The present invention utilizes eddy current damping, thus eliminating friction and the effects of dust.

An object of the present invention is to provide a simplified type of gyroscope suitable for mass production.

Another object is to provide a simplified type of spring mounting for a gyroscope gimbal.

A further object is to provide a gyroscope gimbal mounting that can be quickly and accurately adjusted.

Still another object of the present invention is to provide a gyroscope gimbal mounting that decreases frictional losses.

Another object is to provide a gyroscope gimbal mounting that is not loaded beyond its allowable stress.

A further object is to provide a gyroscope equipped with a damping device that is not affected by dirt or dust.

A final object is to provide a gyroscope that eliminates the need for thrust bearings.

Other objects and many of the attendant advantages of this invention will be readily appreciated as the same becomes better understood by reference to the following detailed description when considered in connection with the accompanying drawings wherein.

Figure 1:
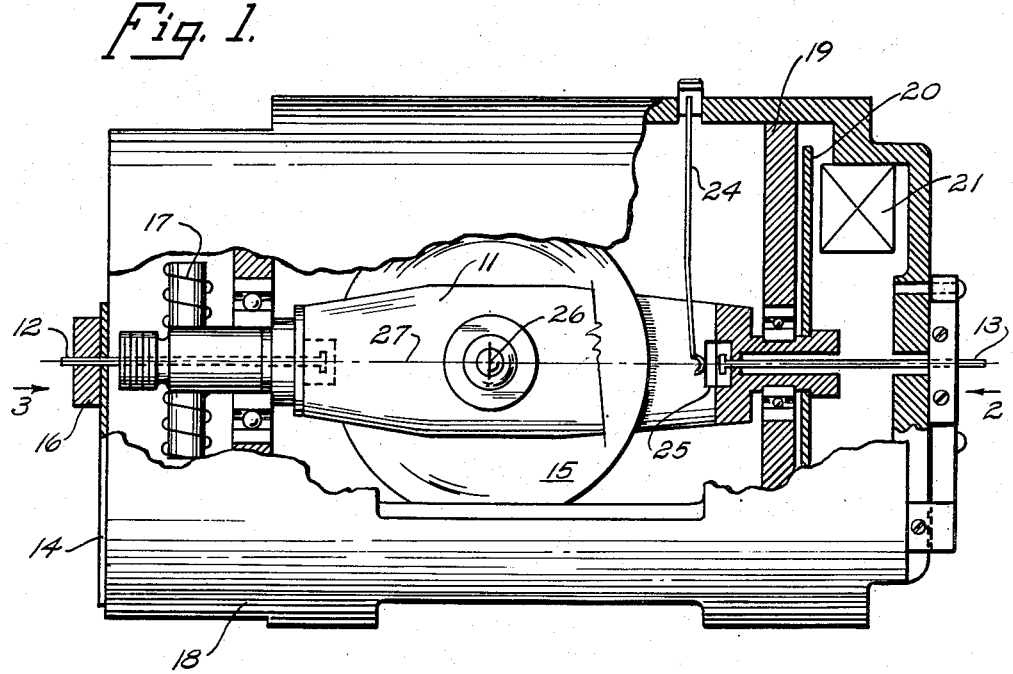
Fig. 1 is a plan view of the present invention illustrating, by way of partial sections, the relative positions of the torsion springs, and damping disk on the gyroscope gimbal.
Figure 2:
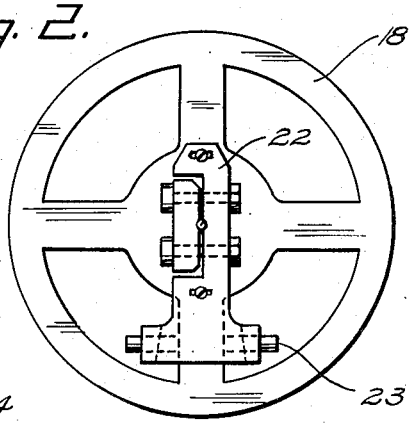
Fig. 2 is a right end view of the present invention illustrating the location of the adjustable clamp and screws.
Figure 3:
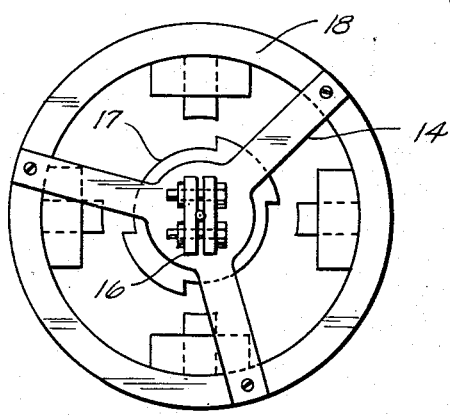
Fig. 3 is a left end view of the present invention illustrating the flexible steel support for the stationary torsion spring.

Referring now to the drawing wherein like reference characters designate like or corresponding parts throughout the several views, there is shown in Fig. 1, the gyroscopic instrument including a gyroscope housing, 18, in which is mounted a gimbal, 11, having a gyroscopic wheel, 15, the axis of which is perpendicular to the axis of the gimbal, 11. The gyroscopic wheel, 15, may be spun by a motor (not shown) having its rotor secured to the wheel, 15, and its stator mounted around the housing, 18. Point contacts, 24, and slip rings, 25, between the gyroscope housing, 18, and the gimbal, 11, are employed in connecting the rotor spinning motor to a suitable source of electrical energy. Suitable bearings in the gimbal provide the spin axis of the rotor and wheel, 15, which is normal to the plane of the paper as indicated at 26. Movement of the gimbal relative to the housing is damped by the eddy current interaction between a stationary cyindrical magnet, 21, mounted on the housing; a soft flux return ring, 19, secured to the housing and serving as the bearing support for the gimbal, 11; and an aluminum damping disk, 20, which is secured to the gimbal and is located in the magnetic field between the magnet, 21, and the flux return ring, 19.

Gimbal, 11, is pivotally mounted in the gyroscope housing about an axis that is perpendicular to the spin axis of the rotor. This gimbal precession axis, generally indicated at 27, is provided by a stationary torsion spring, 12, and an adjustable torsion spring, 13, both of which are mounted on a line coincident with said precession axis. One end of the fixed torsion spring, 12, is fastened rigidly to a flexible steel end, 14, of the gyroscope housing, 18, by a clamp, 16. The other end of the fixed spring, 12, is flattened and is rigidly secured in a mating slot on the gyroscope gimbal so that the spring will be turned as the gimbal precesses. The adjustable spring, 13, at the opposite end of the gimbal and precession axis, is fastened to the gyroscope gimbal in a similar manner but the other end is mounted rigidly in an adjustable clamp, 22, which may be turned with respect to the gyroscope housing, by means of adjusting screws, 23. Axis 27, is the precession axis about which gimbal, 11, is displaced when the gyroscope housing of the described type of pitch rate gyroscopic instrument is angularly displaced about a horizontal axis; an axis parallel to the plane of the paper, and normal to axis, 27, as viewed in relation to Fig. 1. A rotor pickoff coil, 17, rigidly mounted on the gyroscope gimbal, electrically registers the angle of precession, in combination with a suitable stator coil.

The total angle through which the gyroscope gimbal will turn is ±3°, and in accordance with the present invention, each spring is installed with an initial deflection of greater than 3°, so that neither spring would ever operate at zero deflection. This gives a very definite point for the zero position of the gyroscope gimbal; i. e., where the two spring curves cross.

With the foregoing in mind and referring to the accompanying figures, the operation of the device is as follows:

To set the electrical pickoff coil, 17, to give minimum voltage at zero pitch rate, adjustable clamp, 22, is turned in relation to the gyroscope housing, 18, by means of adjusting screws, 23. After the gimbal has been set, as explained above, and the gyroscope is ready for operation let us assume that the gyroscope housing is angularly displaced about an axis parallel to the plane of the paper and normal to the precession axis, 27. The gimbal, 11, will turn in response to this displacement, which will be translated into an electrical voltage by means of rotor pickoff coil, 17. Movement of the gimbal relative to the housing is damped by the eddy current action between the stationary cylindrical magnet, 21, the aluminum damping disk, 20, which rotates with the gimbal, and the stationary soft iron flux return ring, 19.

Obviously many modifications and variations of the present invention are possible in the light of the above teachings. It is therefore to be understood that within the scope of the appended claims the invention may be practiced otherwise than as specifically described.

Having thus described the invention, what is claimed is:

1. Means for supporting the gimbal of a gyroscopic instrument in the housing thereof comprising a flexible steel support mounted at one end of the gyroscope housing; a pair of torsion springs fixed to the opposite sides of the gimbal and coincident with the precession axis thereof; one of said torsion springs adapted to be rigidly mounted in said flexible steel support; and means for twisting the torsion springs so as to rotate the gimbal to a predetermined position in relation to the housing.

2. Means for mounting the gimbal of a gyroscopic instrument in the housing thereof comprising a flexible steel support mounted at one end of the gyroscope housing; a pair of torsion springs fixed to the opposite sides of the gimbal and coincident with the precession axis thereof; said torsion springs adapted to have an initial twist in opposite directions; an adjustable clamp adjustably secured to the gyroscope housing; one of said torsion springs adapted to be rigidly mounted in said flexible steel support and the other of said torsion springs rigidly mounted in said adjustable clamp.

3. Means for mounting the gimbal of a gyroscopic instrument in the housing thereof comprising in combination a flexible steel support mounted at one end of the gyroscope housing; a pair of torsion springs fixed to the opposite sides of the gimbal and coincident with the precession axis thereof; said torsion springs adapted to have an initial twist in opposite direction; an adjustable clamp adjustably secured to the gyroscope housing; one of said torsion springs adapted to be rigidly mounted in said flexible steel support and the other of said torsion springs rigidly mounted in said adjustable clamp; a magnet secured to the gyroscope housing; a flux return ring rigidly secured to the housing to provide a return path for magnetic flux of said magnet; and a damping disk secured to the gimbal and adapted to be rotated in the magnetic field between the magnet and the flux return ring.

RONALD G. WARREN.
STEPHEN KOWALYSHYN.
LEO S. RADKOWSKI.
HARRY E. ELLERMAN, Jr.

References Cited in the file of this patent

UNITED STATES PATENTS

| Number | Name | Date |
|---|---|---|
| 1,240,872 | Perry et al. | Sept. 25, 1917 |
| 1,628,136 | Ford | May 10, 1927 |
| 2,409,178 | Allison et al. | Oct. 15, 1946 |
| 2,585,146 | Maiorany | Feb. 12, 1952 |
| 2,606,447 | Boltinghouse | Aug. 12, 1952 |
| 2,607,230 | Stone | Aug. 19, 1952 |